July 7, 1959
R. P. BARNARD
2,893,727
POWER ACTUATED CLOSURES
Filed April 27, 1956
14 Sheets-Sheet 2
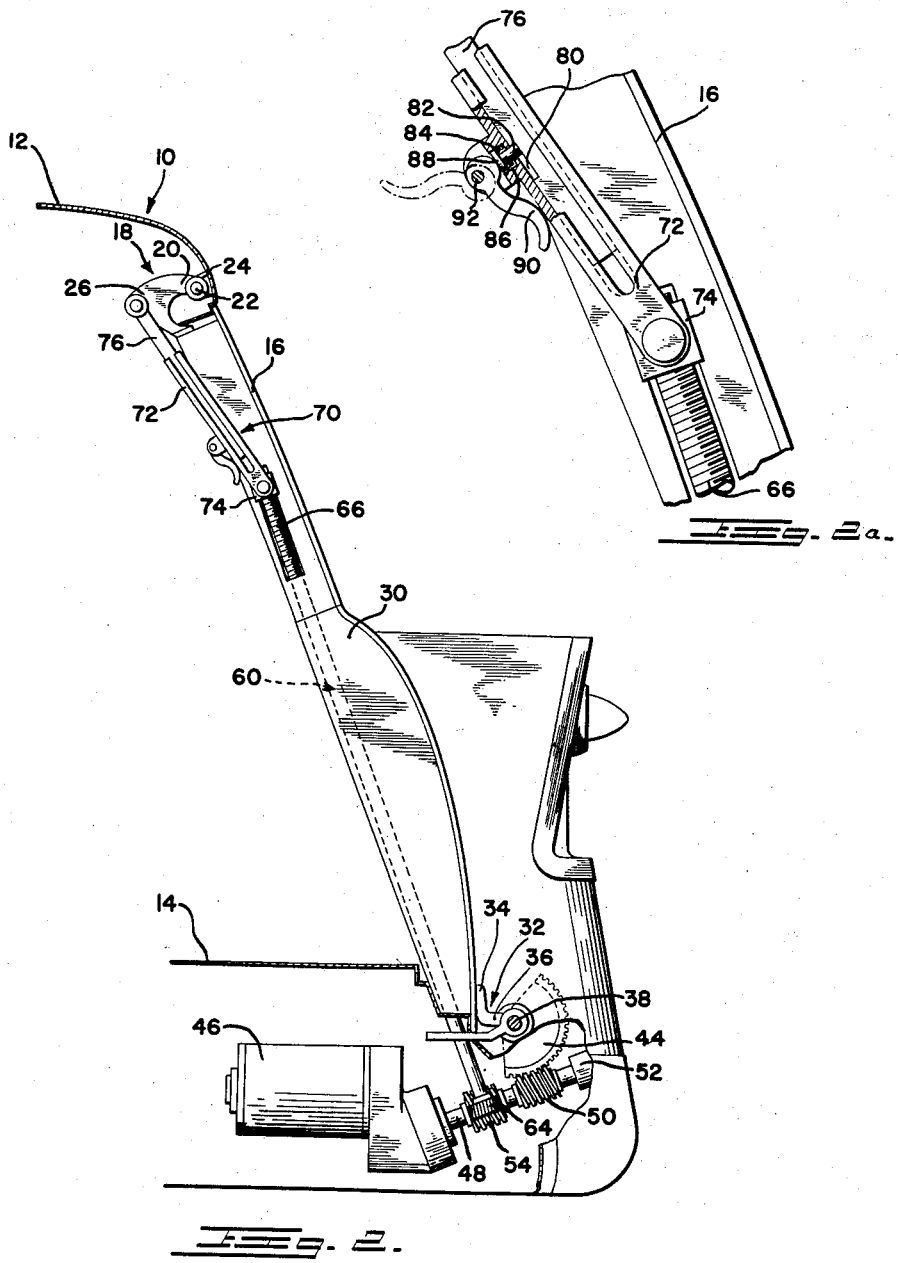
INVENTOR
RICHARD P. BARNARD
BY G.H. Willits
ATTORNEY

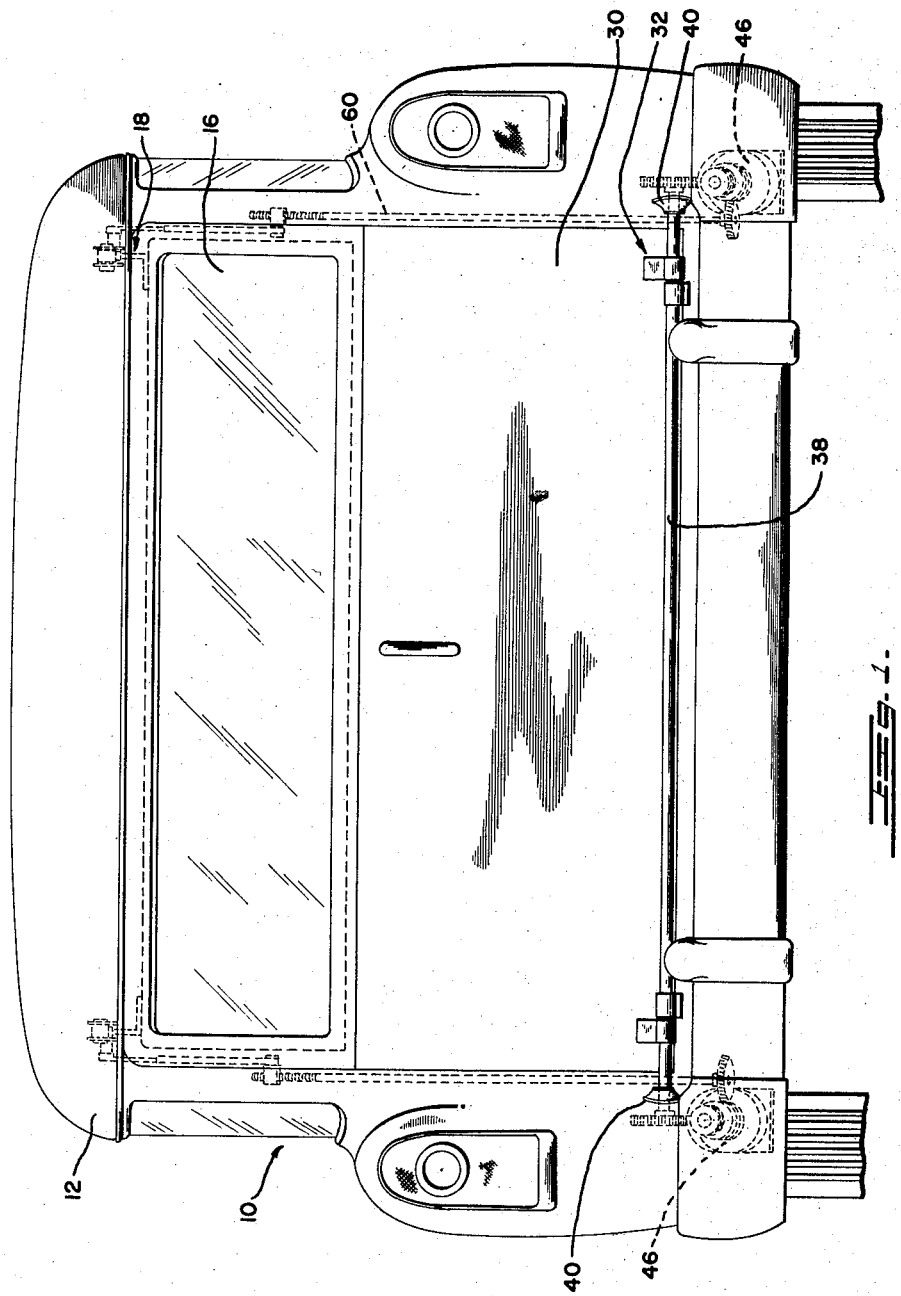

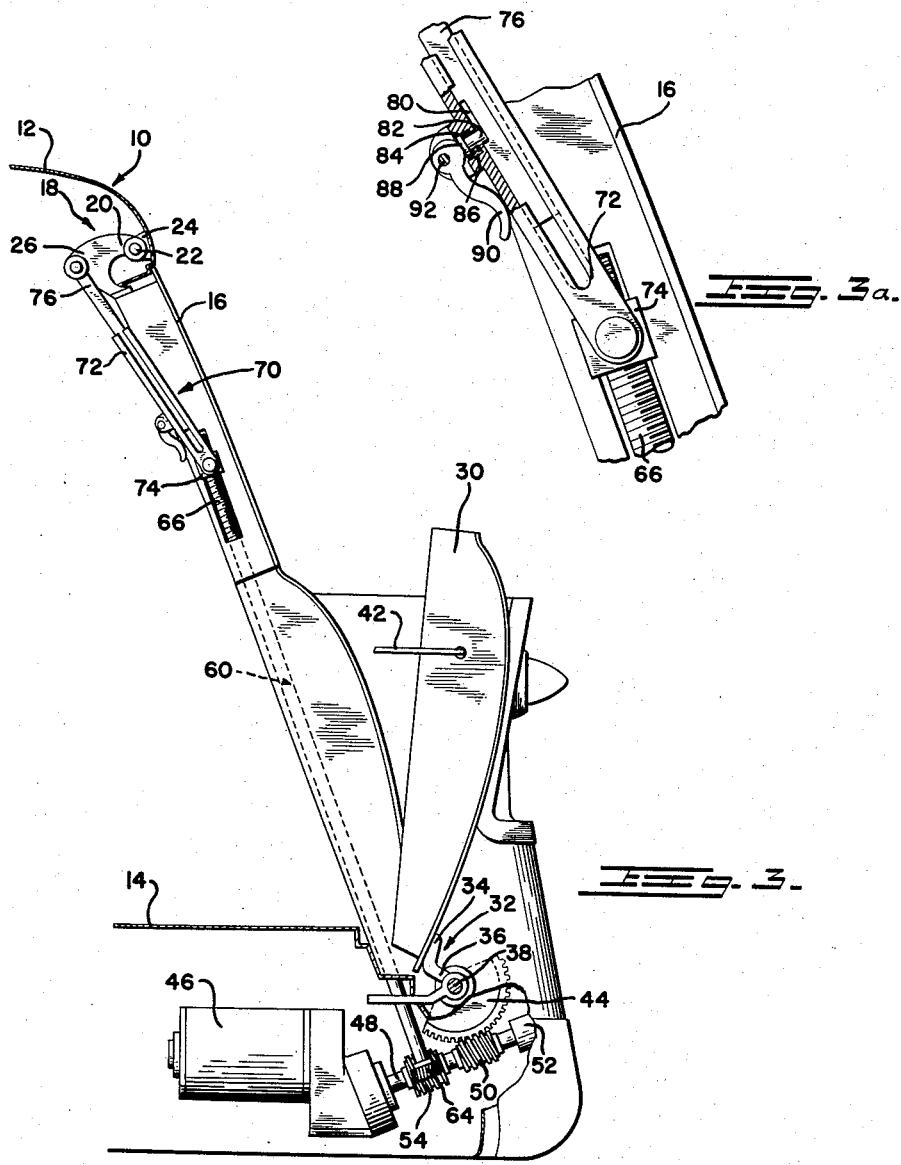

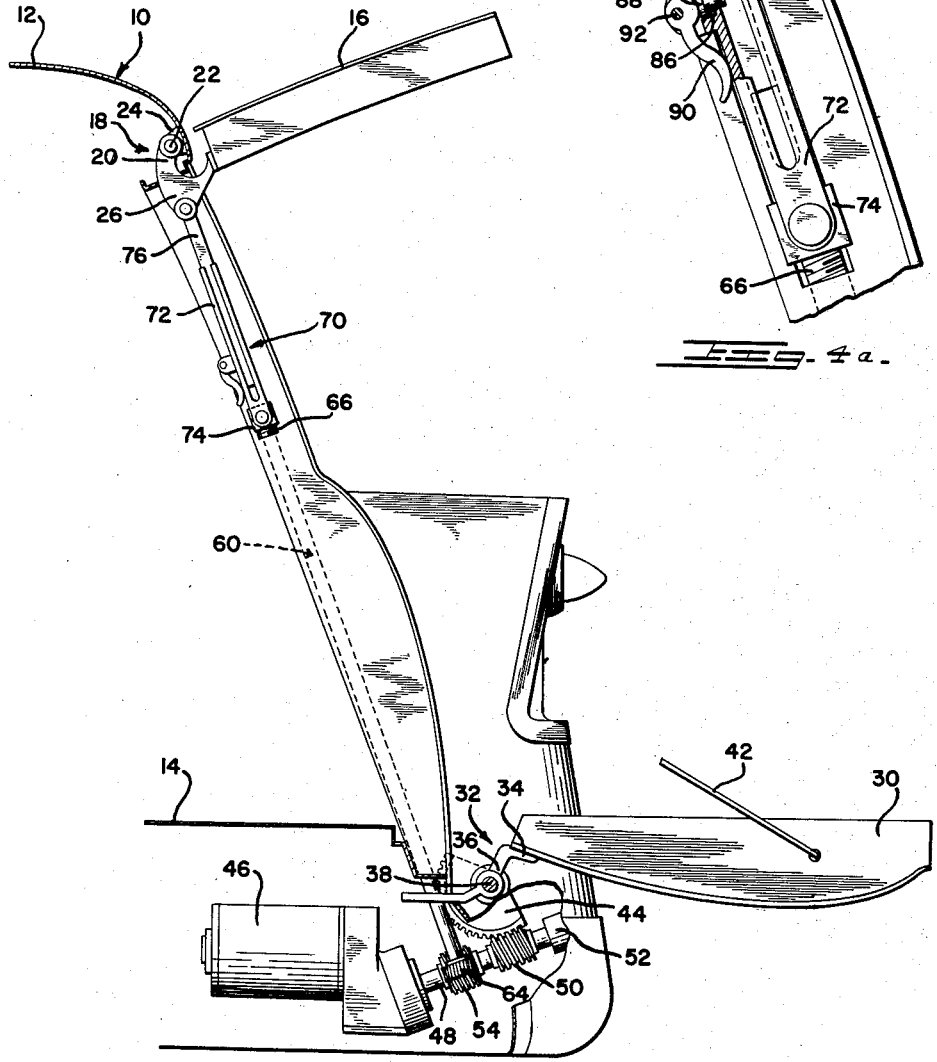

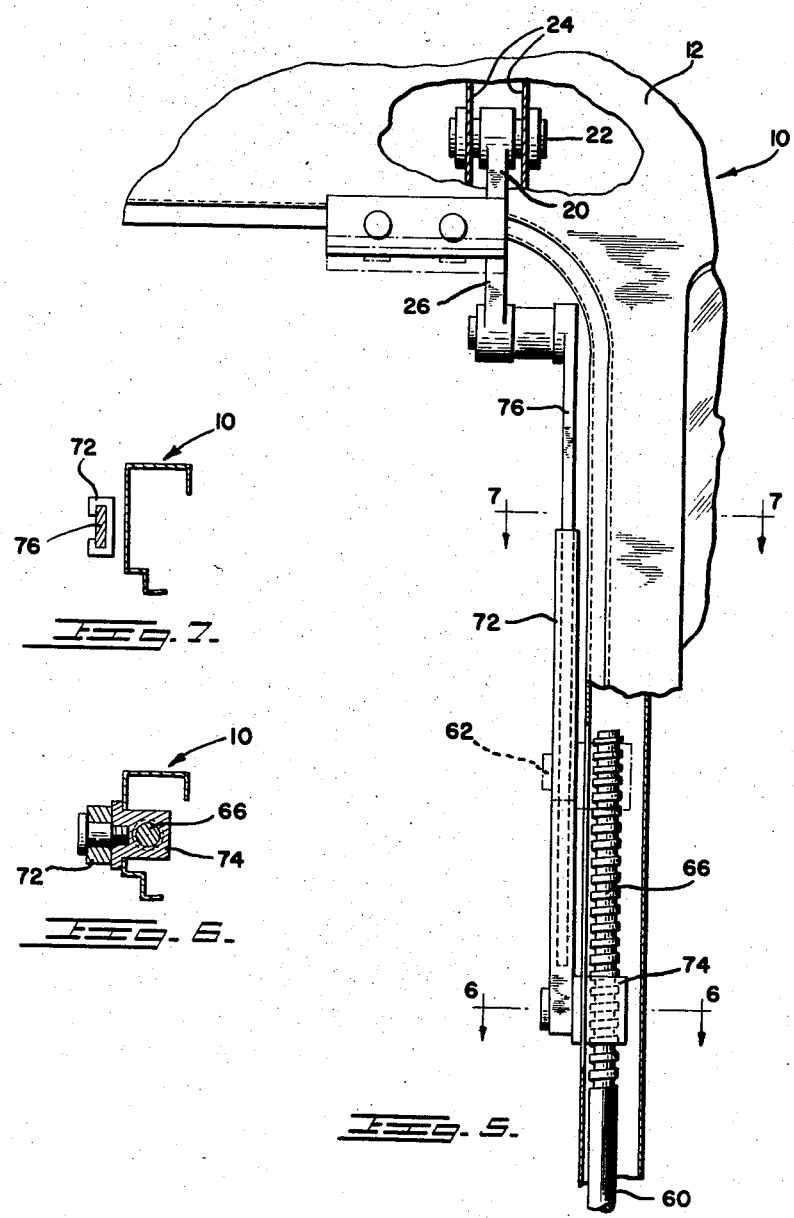

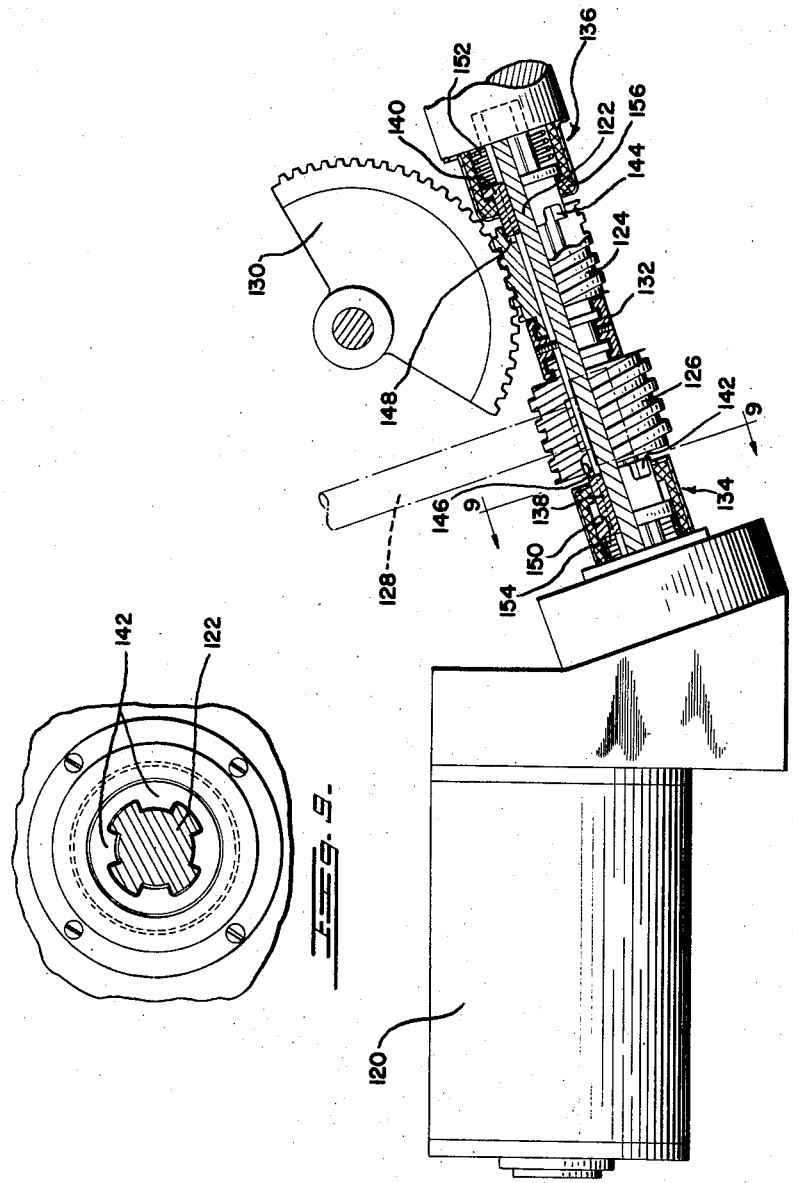

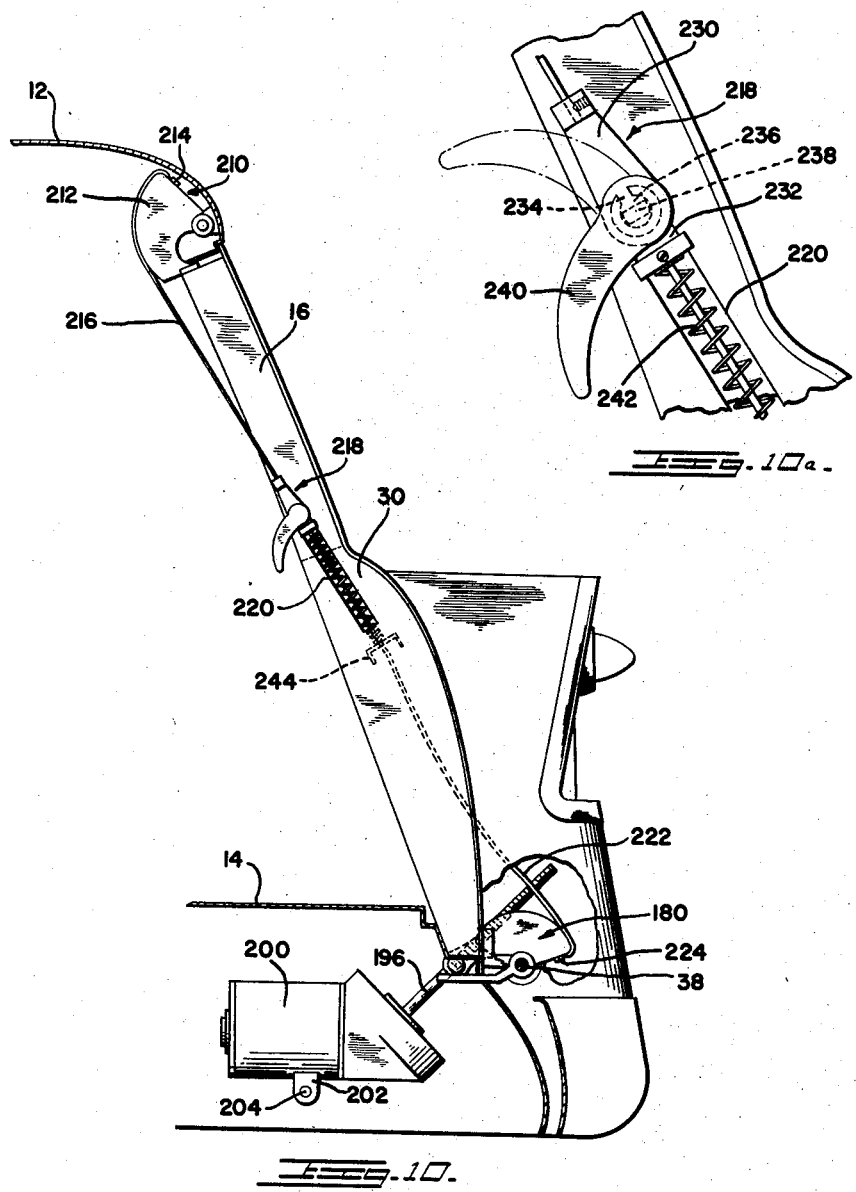

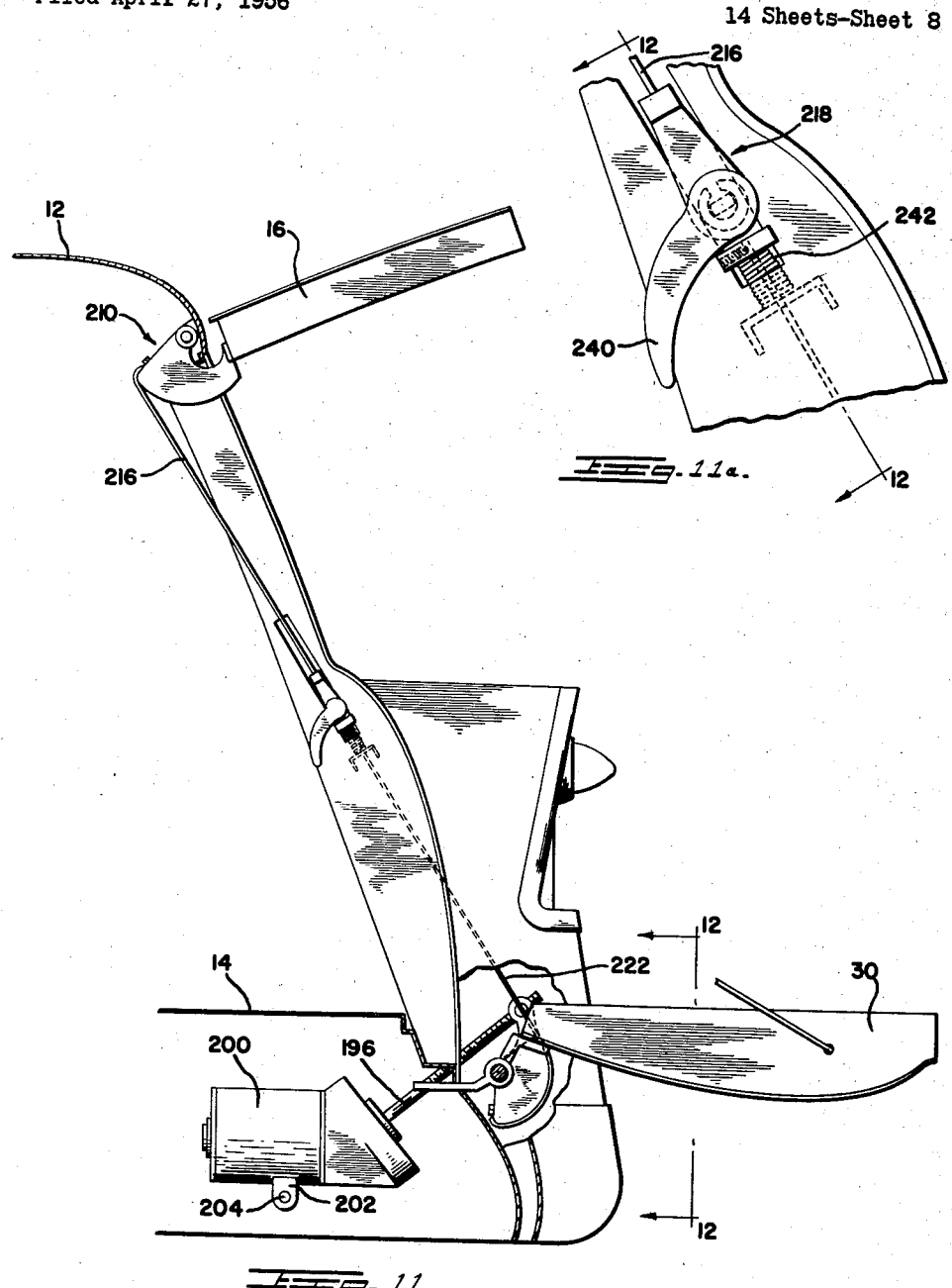

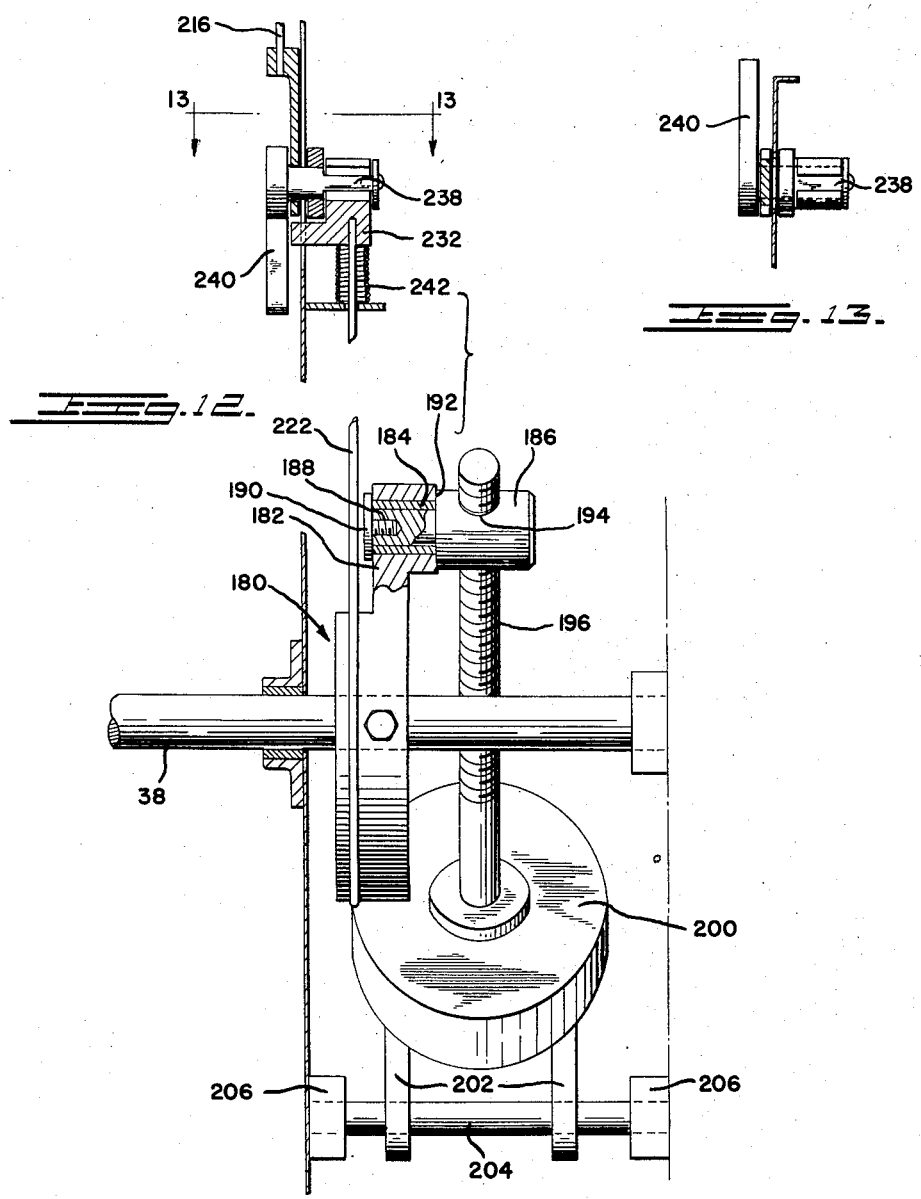

July 7, 1959
R. P. BARNARD
2,893,727
POWER ACTUATED CLOSURES
Filed April 27, 1956
14 Sheets-Sheet 10
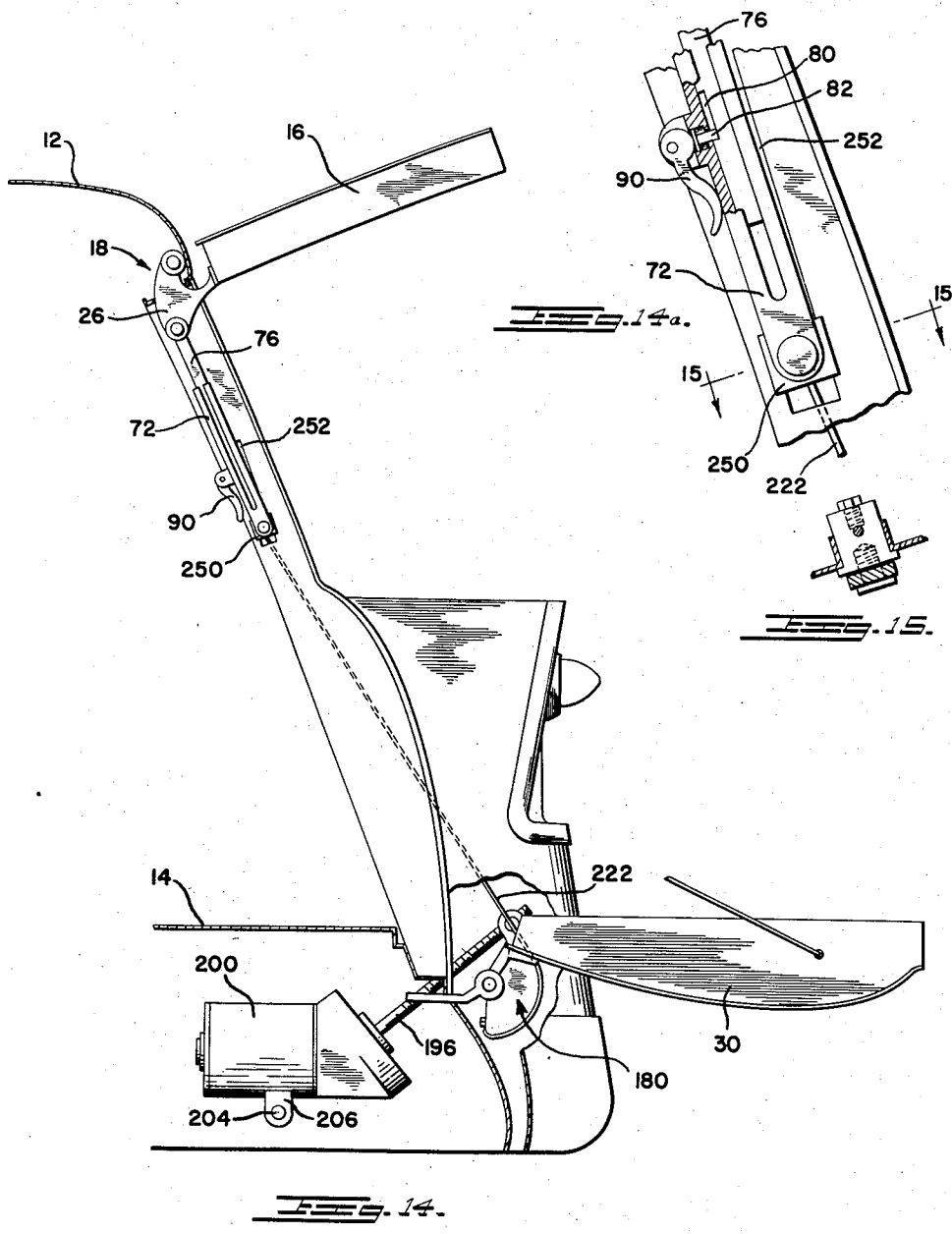
INVENTOR
RICHARD P. BARNARD
BY G. H. Willits
ATTORNEY

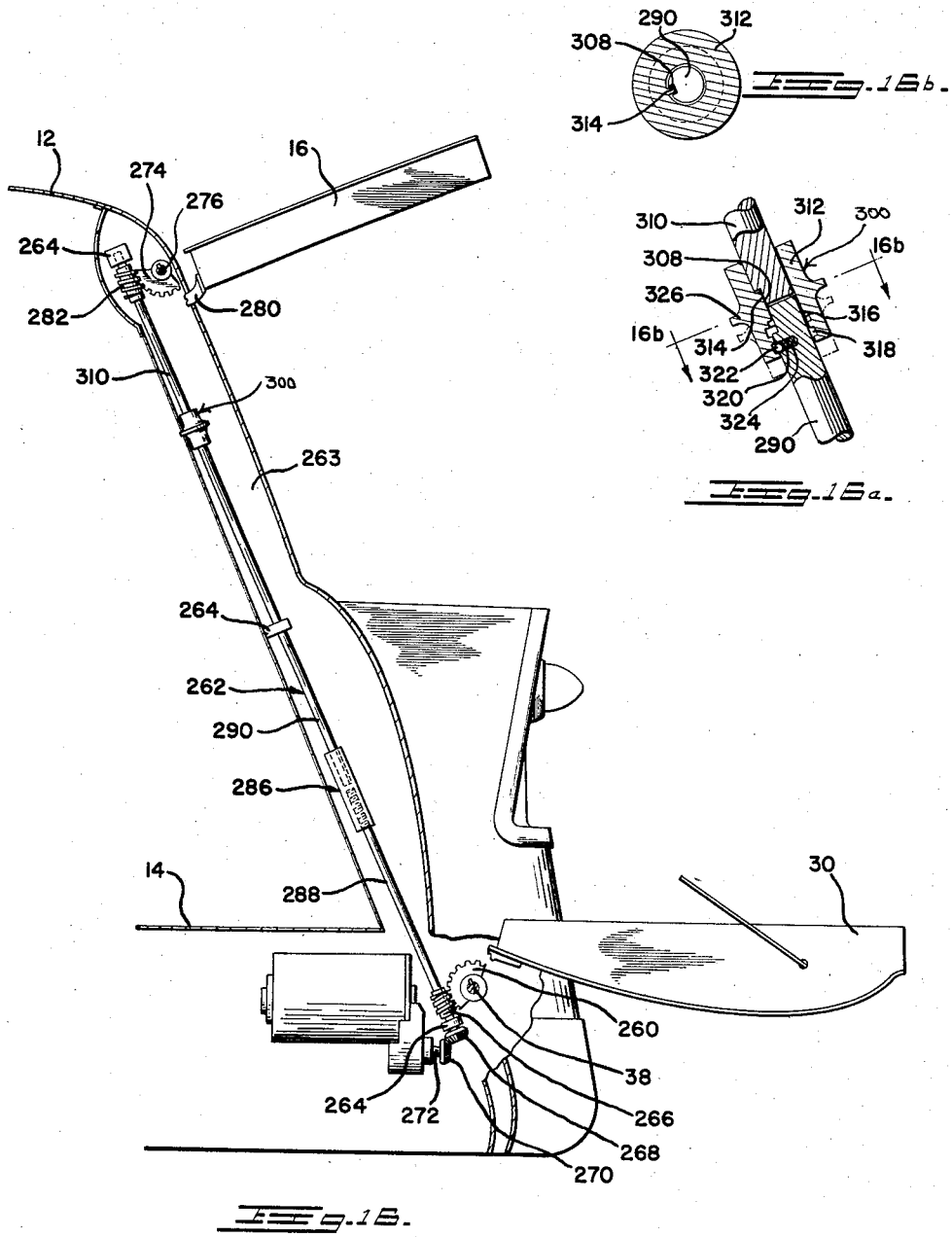

July 7, 1959　　　R. P. BARNARD　　　2,893,727
POWER ACTUATED CLOSURES
Filed April 27, 1956　　　　　　　　　　14 Sheets-Sheet 12
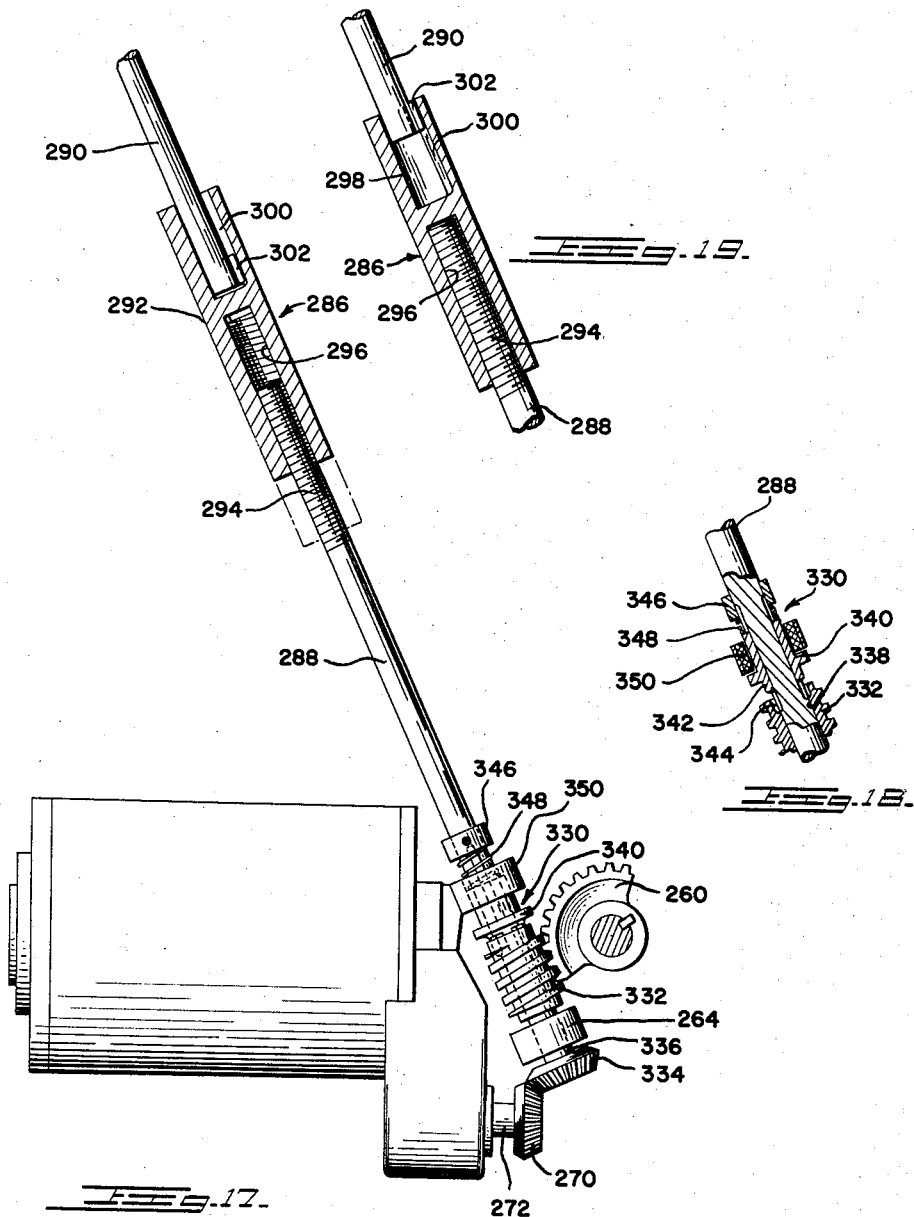
INVENTOR
RICHARD P. BARNARD
BY G. H. Willits
ATTORNEY

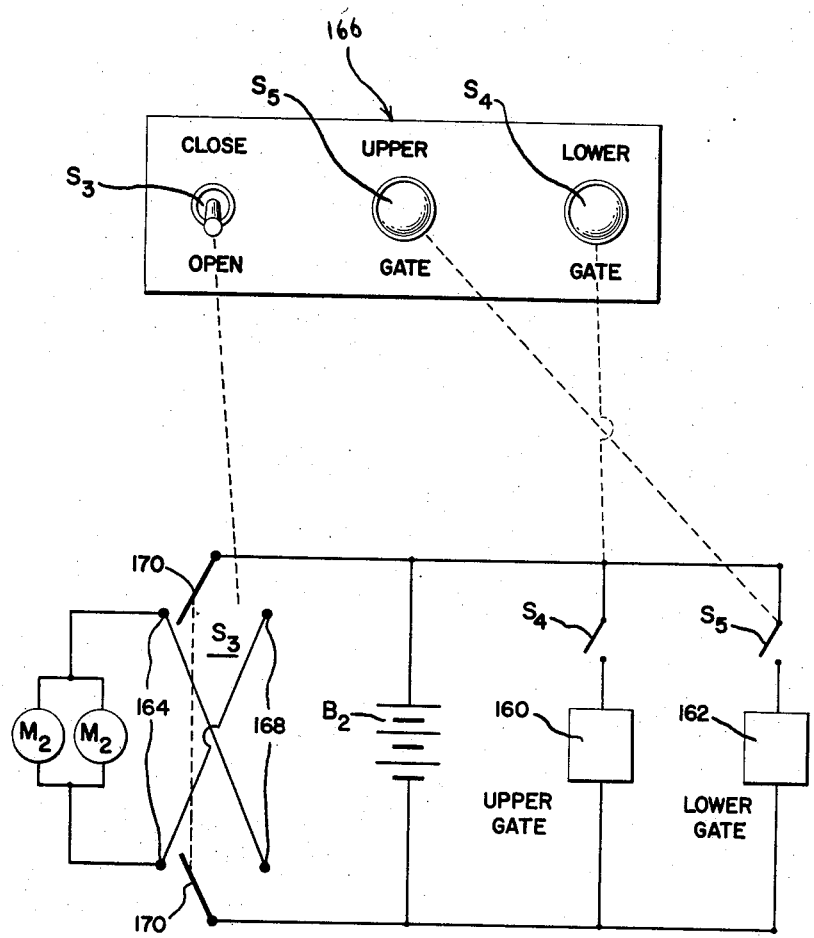

July 7, 1959  R. P. BARNARD  2,893,727
POWER ACTUATED CLOSURES
Filed April 27, 1956  14 Sheets-Sheet 14

INVENTOR
RICHARD P. BARNARD

BY G. H. Willits

ATTORNEY

United States Patent Office 2,893,727
Patented July 7, 1959

2,893,727

POWER ACTUATED CLOSURES

Richard P. Barnard, Alexandria, Va., assignor to General Motors Corporation, Detroit, Mich., a corporation of Delaware Application April 27, 1956, Serial No. 581,085

17 Claims. (Cl. 268—74)

The present invention relates to coordinatingly actuated closure devices. The invention is particularly concerned with such closures which may be adapted for power action.

More specifically, the present closure operated mechanism is designed for use with motor vehicles in which the size, number or remoteness from the operator makes it exceedingly desirable that the closure devices be power controlled and preferably in accordance with a selectable sequence of operation.

While the principles disclosed in relation to the subject device have general applicability to coordinated closures wherever they may be on a vehicle, the present invention has been illustrated and is intended to especially answer a need with respect to power-controlling tailgates for a station wagon type vehicle.

It is an object of the present invention to provide a simple, inexpensive and versatile actuating mechanism which will particularly enable station wagon tailgates to be actuated in any one of a number of ways in accordance with the need to be fulfilled at any given time. Accordingly, the various species of the subject tailgate actuating mechanism have been designed to permit joint operation of both tailgates whereby the gates may be opened or closed in unison. In order to reduce the size, and hence the cost, of the power means required to so actuate a pair of tailgates the actuating mechanism has been uniquely arranged to insure that while the tailgates may be actuated generally in unison, it will be necessary to drive but one of the tailgates against the force of gravity. Were it otherwise, it would be necessary, particularly during the initial opening movement when both tailgates are gravity-closed, to have a motor large enough to provide an otherwise unnecessarily large starting torque.

To enhance its utility and versatility, the present closure actuating mechanism has been further designed to include control devices whereby one of the closures may be operated completely independently of the other when this type of operation better fulfills the desires of the vehicle users. Again using the station wagon for illustrative purposes, ventilation needs are frequently best served by opening the upper tailgate while allowing the bottom to remain closed. Or, on the other hand, it may suffice to open only the bottom tailgate for loading purposes.

A further refinement of the present invention provides an actuating mechanism which enables the closures, or tailgates, to be controlled independently of each other.

To realize maximum utility from the subject closure actuating mechanism it is preferred, in all forms, that it be power actuated and that the power actuation be controllable from the driver's station within the vehicle although it is completely feasible that the power actuating mechanism be controllable from a plurality of stations on the vehicle.

Notwithstanding the provision of actuating mechanisms which coordinate the opening and closing movements of vehicle closures, and further which include means for power actuating the mechanisms, all species of the present invention have been designed in such a way as to be readily adaptable to present production type vehicles, more specifically station wagon, in which there are relatively limited amounts of space within which to place such mechanisms.

The structures and mechanisms whereby the closure control set forth above is realized will be hereinafter set forth in detail.

In the drawings:

Figure 1 is a rear view of a vehicle embodying the first specie of the subject invention, Figure 2 is a partial rear quarter elevational view of said first specie.

Figure 2a is an enlarged detail of part of the mechanism shown in Figure 2.

Figures 3, 3a, 4 and 4a show the first specie in various stages of operation.

Figure 5 is a fragmentary rear view showing details of a portion of the operating mechanism of the first specie.

Figure 6 is a sectional view along line 6—6 of Figure 5.

Figure 7 is a sectional view along line 7—7 of Figure 5.

Figure 8 is a sectional view of modified form of actuating mechanism which permits complete remote and independent control of both tailgates.

Figure 9 is a sectional view along line 9—9 of Figure 8.

Figure 10 illustrates a second specie of the invention.

Figure 10a is an enlarged fragmentary detail of Figure 10.

Figures 11 and 11a show the second specie with the tailgates open.

Figure 12 is a partially sectioned elevational view of the upper and lower tailgate actuating mechanisms of the second specie.

Figure 13 is a view along line 13—13 of Figure 12.

Figure 14 is a third specie of the subject invention.

Figure 14a is a fragmentary enlargement of Figure 14.

Figure 15 is a view along line 15—15 of Figure 14a.

Figure 16 is a fourth specie of the subject invention.

Figure 16a is a fragmentary enlargement of Figure 16a.

Figure 16b is a sectional view along line 16b—16b of Figure 16a.

Figure 17 represents a modified form of the fourth specie.

Figure 18 is a partial detail of Figure 17.

Figure 19 shows the lost motion mechanism of Figure 17 in another position.

Figure 20 is a diagrammatic electrical control system for the mechanism shown in Figure 8.

Figure 21:
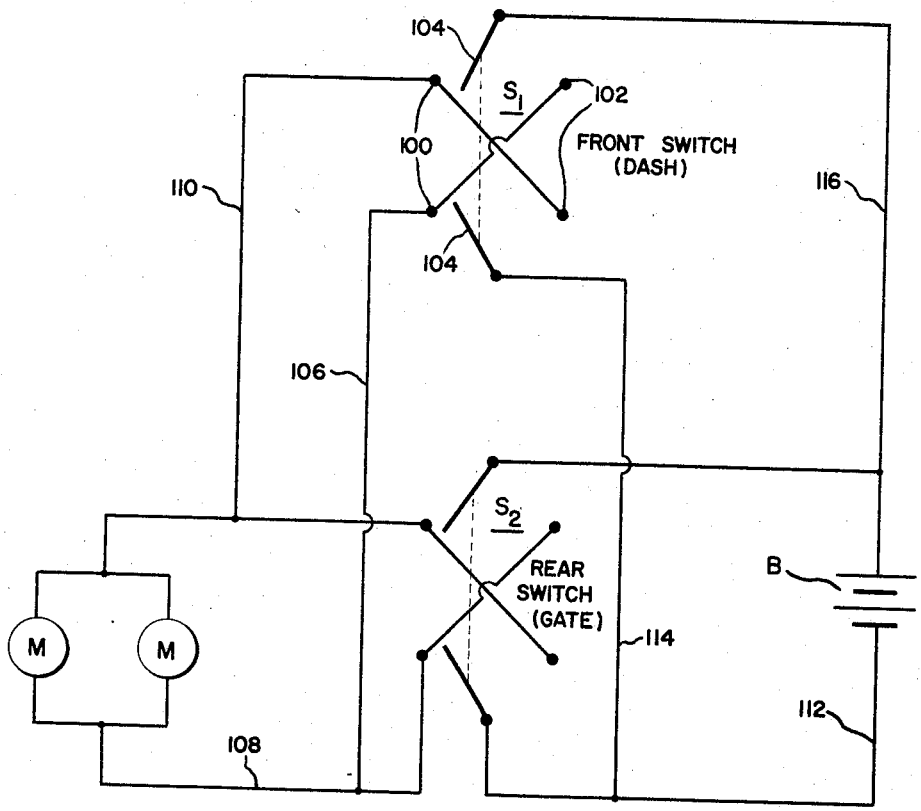
Figure 21 is a diagrammatic electrical control sytem for the mechanism shown in Figure 2.

As is common to all species of the invention, the rear quarter of a station wagon type vehicle is shown at 10 and includes a roof portion 12 and a floor or frame portion 14. An upper tailgate member 16 includes a goose neck type bracket or hinge 18 rigidly fixed to the upper edge thereof. Hinge 18 includes a leg portion 20 pivotally mounted upon roof 12 through a pin 22 and a supporting bracket 24. Hinge 18 also includes another leg 26 disposed generally intermediate leg 20 and portion of the hinge fixed to the upper tailgate. Suffice it to say at this point that one end of the power actuating mechanism is adapted to be articulated to leg 26 of hinge 18.

A lower tailgate member 30 similarly includes a hinge 32 having one leg 34 rigidly secured to the tailgate and another leg 36 secured to a trunnion shaft 38. Shaft 38 is suitably supported within a bearing structure 40 on the vehicle body. As in the case of the upper tailgate 16, means is provided, through which the aforesaid power actuating mechanism acts to actuate the lower tailgate.

It is intended that in all of the species of the present invention a conventional retractable cable 42 be articulated intermediate the upper and lower edges of the lower tailgate and anchored at the other end to a coiling mechanism within the vehicle body will be provided as a load supporting device for the lower tailgate. Cable 42 and associated recoil mechanism forms no part of the present invention.

For the sake of simplicity, the tailgate actuating mechanism has been illustrated in detail on just one side of the vehicle. It is to be understood, however, that such mechanism is preferably duplicated on opposite sides of the vehicle as shown generally in Figure 1. If desired, the power actuating mechanism may be disposed completely on one side or the other of the vehicle, although such an alternative is not preferred, first of all because of the correspondingly larger parts that would be required on one side than the other, including a larger motor. Further, providing the power actuating means on one side of the vehicle only would result in a considerable unbalance of forces possibly resulting in certain torsional deflections which might otherwise damage or unduly strain certain parts of the tailgate actuating or pivoting mechanism.

Referring more specifically to the species shown in Figures 2 through 7, the lower tailgate trunnion shaft 38 has rigidly secured thereto a gear segment 44 of suitable arcuate size to permit full opening and closing of the lower gate. Disposed below the gear segment 44 and suitably supported within the vehicle body is a motor 46 which includes a rotatable shaft 48 having rigidly mounted thereon a worm gear 50 adapted to engage the gear segment 44. The end of shaft 48 remote from motor 46 is supported within a bearing 52 secured within the vehicle body.

Also rigidly mounted on shaft 48 intermediate worm gear 50 and motor 46 is another worm gear 54 adapted similarly to rotate with said shaft.

A shaft 60 is rotatably supported within the vehicle body by suitably spaced bearing means, one of which is shown in dotted lines at 62 in Figure 5. Shaft 60 is disposed substantially at right angles to power shaft 48. Fixed to the lower end of rotating shaft 60 is a gear member 64 adapted to co-act with the worm member 54. The other end of shaft 60 is provided with a threaded portion 66.

Articulated to leg 26 of hinge 18 is an extensible or telescoping linkage mechanism 70. The other end of linkage mechanism 70 is mounted upon rotatable shaft 60 in such a way as to be longitudinally movable relative thereto and also as to permit rotary movement of shaft 60 relative thereto. As best seen in Figures 2 through 4 the lower or outer member 72 of the extensible linkage mechanism 70 has an internally threaded nut 74 articulated at the lower end thereof and which nut co-acts with the threaded portion 66 of shaft 60. Accordingly, rotary movement of shaft 60 will occasion relative longitudinal movement of the nut 74 and hence of the lower member 72 of the extensible linkage mechanism 70.

The upper or inner member 76 of the extensible linkage mechanism 70, as already noted, is articulated at one end to hinge 18 and is telescopically disposed within the lower member 72. As seen in Figures 2 and 4, depicting the closed and opened positions of the tailgates, as longitudinal movement along rotatable shaft 60 is imparted to the lower end of member 72 a force will be transmitted through member 76 to the hinge 18 rotating the same about the fixed pivot 22, and, accordingly, opening or closing, as the case may be, the upper tailgate 16.

As thus far described, it will be seen that as power shaft 48 is rotated, worm gears 50 and 54 respectively rotate the gear segment 44 and gear 64 to actuate the upper and lower tailgates in unison. To open the tailgates 16 and 30 motor shaft 48 rotates worms 50 and 54 to respectively rotate segmental gear 44 in a clockwise direction and shaft 60 in a direction to cause nut 74 to move downwardly thereon.

While the mechanism as thus far described is operative to open and close the tailgates, more satisfactory overall operation is realized with further refinements of the actuating mechanism which will now be discussed.

With both the upper and lower tailgates 16 and 30 in the closed position, shown in Figure 2, it would be necessary for the motors 46 to rotate both of the tailgates against the force of gravity during initial opening. It is apparent why this is true with respect to the upper tailgate which throughout its opening movement is opposed by the force of gravity. With respect to the lower tailgate, however, it will be seen that in the closed position the gate is inclined forwardly due to the general forward inclination of the rear portion of the body and consequently the center-of-gravity of the lower tailgate is disposed forwardly of the trunnion shaft 38. Therefore, until sufficient opening movement of the lower gate has taken place to longitudinally translate the center-of-gravity of the lower tailgate rearwardly until it falls aft of the trunnion shaft axis 38, the lower tailgate also is being moved against the force of gravity. Once having rotated the lower tailgate to where its center-of-gravity is disposed rearwardly of the trunnion shaft 38, the remaining opening movement of this gate will be achieved through the force of its own mass. Accordingly, in order to reduce the size of motors 46 by reducing the load thereon, a lost motion mechanism is provided in the tailgate actuating mechanism which permits the lower tailgate to be moved from the closed position rearwardly until its center-of-mass is over-center relative to trunnion 38 before actuation of the upper tailgate begins. In this way at no time are the motors 46 required to move both of the tailgates against the force of gravity and therefore smaller motors may be utilized resulting in a saving in both space and cost.

While it may otherwise be provided, such a lost motion mechanism has been conveniently provided within the extensible linkage mechanism 70. As seen in Figures 2 and 3, the lost motion mechanism includes a slot 80 in the inner member 76 and a stud 82 mounted on the outer member 72. Thus, the longitudinal extent of the slot 80 determines the amount of lost motion that will take place before the stud 82 abuts against the shoulders at the end of slot 80. With the tailgates in the closed position, as shown in Figure 2, the stud will actually be disposed proximate, or in abutting relation with, the upper shoulder of slot 80 in which case the lower member 72 of the extensible linkage mechanism may move downwardly in an amount equal to the length of the slot without imparting any motion to the inner linkage member 76. By the time the stud member 82 engages the lower shoulder of slot 80, the lower tailgate will have moved over-center, as shown in Figure 3, in relation to trunnion shaft 38 and at this point further downward movement of the lower or outer member 72 will, through stud 82, be transmitted to the inner member 76 to initiate the opening movement of the upper gate member 16.

Upon occasion, it is desired, as for loading purposes, to merely open one or the other of the tailgates without regard to the other. To this end, means has been provided whereby it is possible to actuate one tailgate while the other tailgate remains in the closed position. For illustrative purposes, a mechanism has been shown which permits actuation of the lower tailgate without the upper. Such a disconnect mechanism has been incorporated with the lost motion mechanism just described and includes the stud and slot 82 and 80 already described. In order to disconnect the stud of the lower member 72 from the slot 80 of the upper member 76, the stud has been made transversely movable under the influence of a spring member 84 seated within a transversely extending recess 86 in the lower member. The other end of the spring 84 biases against a head 88 formed on the stud in which case the stud is resiliently urged out of engagement with the inner member slot 80. As seen in Figures 2 and 3 a lever 90 is pivotally mounted on a pin 92 mounted within a bracket extension formed on member 72. Lever 90 includes an eccentric cam surface 94 surrounding pin 92. With the lever 90 in the position shown in Figure 2, the high point of the cam 94 is in engagement with the head 88 of the stud 82 holding the latter in operative engagement with the inner member 76. When it is desired to provide unlimited axial movement of the outer member 72 relative to the inner member 76 of the extensible linkage mechanism, and to thereby permit complete opening and closing of the lower tailgate member without actuation of the upper tailgate, lever 90 is rotated in a clockwise direction about pin 92 thereby moving the low part of the cam 94 into engagement with the head of stud 82 causing the latter to move out of engagement with slot 80 under the influence of spring 84. When it is desired to reconnect the inner and outer members 72 and 76 of the extensible linkage mechanism, the lower tailgate is closed and thereafter the disconnect lever 90 rotated in a counter-clockwise direction moving the stud 82 axially inwardly into operative engagement with the slot 80 of the inner member 76.

Through the retractable stud arrangement as just described there has been provided, in effect, two separate and distinct lost motion mechanisms. One of these lost motion mechanisms, including solely the abutting relationship between stud 82 and the shoulders of slot 80 permitting limited relative movement between the upper and lower tailgates, while the other lost motion or disconnect mechanism, including the disconnect lever 90, permits unlimited relative movement between the lower and upper tailgates.

By providing the limited lost motion mechanism as described which permits partial opening of lower tailgate with respect to the upper tailgate, there is created a problem of insuring that once the opening movement of both the upper and lower tailgates has begun they reach their full open positions at essentially the same time. While there are many ways in which this result can be achieved, one solution is to control the tailgate actuation rates through the use of different sized worm gears 50 and 54. Worm gear 50 is smaller than worm gear 54 and also drives a larger gear segment 44 than the gear 64 driven by worm 54. Thus, in going from a small gear to a large gear the rate of opening of the lower tailgate will be relatively slower than is the case with the upper tailgate in which a large worm gear 54 drives a relatively smaller gear 64. Accordingly, the proportioning of the gears sizes, in conjunction with the length of the slot 80 in the inner member 76 of the extensible linkage mechanism, while permitting the lower tailgate to open first a given amount, insures that once the actuation of the upper tailgate begins its opening motion will be faster in a proportion which enables the upper and lower gates to reach their full open position at the same time.

It would be otherwise possible to change the differential rate of actuation between the upper and lower tailgates by either changing the angular lead of the thread 66 on rotatable shaft 60 or by providing differential leads between the helices on the worm gears 50 and 54.

In order to control the actuating mechanism illustrated in Figures 1–7, as well as other of the mechanisms to be discussed subsequently, an electrical control system is shown diagrammatically in Figure 21. As shown therein a pair of parallel connected reversible D.C. motors are indicated at M and correspond to the motors 46 heretofore referred to. A pair of multiple throw switches $S_1$ and $S_2$ are connected in parallel intermediate motors M and a source of power B. Two switches have been provided for added convenience since $S_1$ may be mounted on the instrument dash proximate the driver, while $S_2$ may be mounted near the tailgates for controlling tailgate actuation exteriorly of the passenger compartment. To prevent tampering, $S_2$ could have a locking means associated therewith.

Inasmuch as both switches $S_1$ and $S_2$ are connected in parallel and are otherwise functionally as well as structurally identical, it will suffice to merely describe the operation of $S_1$. The "open" terminals are shown at 100 and the "closed" terminals at 102. Terminals 100 connect to opposite sides of motors M through lines 106—108 and 110 while throws 104 are connected to opposite sides of the battery B through lines 112—114 and 116. When the interconnected throws 104 are moved to the left into engagement with terminals 100 current will flow through the motors to rotate the shafts 48 and open the tailgates. Upon shifting the throws to engage terminals 102 the current will be reversed thus closing the tailgates.

While the control system illustrated is electrical, it would be equally possible, if desired, to utilize pneumatic or hydraulic control systems in which event a pump, valves and servo motors would be appropriately substituted for battery B, switches $S_1$ and $S_2$ and motors M.

To provide for more complete control over tailgate operation a modified actuating mechanism is shown in Figure 8. The mechanism shown in this figure may be substituted generally for the motor shaft and worm gears shown in Figures 2–7. The mechanism of Figure 8 is adapted to permit coordinated operation of the tailgates, as already described, and additionally provide means whereby each of the tailgates may be power actuated independently of the other.

In Figure 8 a motor 120 drives a shaft 122 having a pair of freely rotatable axially spaced worm gears 124 and 126 mounted thereon. Worm gears 124 and 126 are adapted to respectively mesh with a gear, not shown, which drives shaft 128 and segmental gear 130. To maintain proper axial spacing therebetween the worm gears 124 and 126 are relatively rotatably connected through a spacing member 132.

In order to variously actuate the tailgates, a pair of solenoid clutches 134 and 136 are provided through which the worm gears may be selectively coupled to the power shaft 122. Clutches 134 and 136 include armature members 138 and 140 slidably splined to shaft 122 for rotation therewith. Members 138 and 140 have longitudinally extending clutch teeth 142 and 144 formed thereon which are adapted to engage with corresponding teeth 146 and 148 formed internally of worm gears 126 and 124. The splined members 138 and 140 are biased through springs 150 and 152 into clutching engagement with gears 126 and 124 and in which condition power is transmitted to the lower and upper tailgates in the same manner as described with respect to the mechanism of Figures 2–7.

In order to declutch member 138 or 140 and thereby actuate either the lower or upper tailgate only, solenoid coils 154 and 156 are provided and surround the said armature members. Upon energization of one or the other of the coils the subadjacent splined armature member is moved axially against the force of the engaging spring to declutch the worm gear drive. In this way the remaining clutched worm gear remains conditioned to actuate the associated tailgate.

An electrical control system for the actuating mechanism of Figure 8 is diagrammatically shown in Figure 20. For the sake of simplicity, the control system has been illustrated with a single control panel 166. It is apparent that additional parallel-connected control panels may be provided as desired.

Power is again supplied to parallel connected D.C. motors $M_2$ from a battery $B_2$ and which motors may be reversely driven through the control of a double throw switch $S_3$. Switch $S_3$ includes "open" terminals 164 and "close" terminals 168. Each of the terminal sets is adapted to be connected across the power source $B_2$ by the interconnected throws 170. Solenoid coils 160 and 162 are connected across the power source $B_2$ and are controlled by switches $S_4$ and $S_5$. With the motor control switch $S_3$ moved to the "open" or "close" position on the control panel and solenoid switches $S_4$ and $S_5$ open both tailgates will be actuated as described, supra. Assuming the operator desires to open the upper tailgate only, the "Upper Gate" button switch $S_5$ is closed which energizes the lower gate solenoid 162 thereby declutching the power shaft from the lower gate control mechanism; thereafter the motor switch $S_3$ is moved to the "open" position causing the motors $M_2$ to actuate the upper tailgate 16.

While, as suggested, the actuating mechanism of Figure 8 may be substituted in the modification shown in Figures 2–7, in so doing it is apparent that the disconnect lever 90 is no longer needed since its function of rendering one of the tailgates inoperative is supplanted by a solenoid clutch.

Another modification of the tailgate actuating mechanism is shown in Figures 10 through 12. In this modification it is possible to substitute flexible motion transmitting members for most of the rigid members shown in the modification of Figure 2. A segmental sheave 180 has been substituted for the segmental gear 44 of the previous modification. Sheave 180 is likewise rigidly fixed to the trunnion shaft 38. As best seen in Figure 12, sheave 180 includes a leg 182 projecting therefrom and to which the motor power shaft 48 is generally articulated. More specifically, leg 182 of sheave 180 includes a transverse bore 184 disposed in the outer end thereof and within which a rotatable arm 186 is locked. Arm 186 includes a threaded bore 188 within which a capped stud 190 is adapted to be threaded and which in conjunction with a shoulder 192 formed on arm 186 locks the arm against longitudinal movement while permitting rotary movement relative to sheave leg 182. A threaded diametral bore 194 is formed through the rotatable arm 186 and is adapted to be threadably engaged by a correspondingly threaded motor power shaft 196. In order to insure non-binding operation between shaft 196 and arm 186, the motor 200 is pivotally mounted to the body through a suitable connection, which includes motor bracket 202, pin 204 and body bracket 206. Thus, upon rotation of the power shaft 196, from the closed lower tailgate position as shown in Figure 10, the rotatable arm 186 will thread axially along the threaded portion of the power shaft 196 thereby rotating sheave 180 to the open position as shown in Figures 11 and 12. Inasmuch as the movement of sheave arm 182 is arcuate it will be apparent that the motor 200 will oscillate about pin 204 during the opening and closing of tailgate 30.

To again coordinate the opening of the upper tailgate 16 with that of the lower tailgate 30, the upper gate hinge 210 is formed with an arcuate peripheral segment or sheave 212. Suitably anchored to the upper portion of the hinge 210 through a stud 214 is one end of a flexible cable 216. The other end of cable 216 is fixed to a connecting device 218 which is in turn slidably mounted on a track way 220 supported on the vehicle body. Also secured to the device 218 in axial alignment with cable 216 is a second cable 222, the other end of which is similarly anchored by a stud 224 to sheave 180. In the closed tailgate position, Figure 10, cable 222 is unwrapped in relation to its supporting sheave 180 while cable 216 is wrapped about its sheave 212.

Thus, as sheave 180 is rotated in a clockwise direction to open the lower tailgate, the cable 222 will be wrapped on the sheave pulling it downwardly and causing the connecting device 218 to slide downwardly on the track 220 which in turn causes the cable 216 to move downwardly to rotate sheave 210 counterclockwisely and unwrap itself relative to the sheave and thereby imparting an opening movement to the upper tailgate 16.

In order to reduce the frictional losses and otherwise reduce the power necessary to actuate the tailgate members, it will be seen in Figures 10 and 11 that the cables 216 and 222 as will as track 220 and collar 218 are aligned in a straight line. In this way the forces applied to open and close the respective tailgates are in a straight line which eliminates any force components in a direction normal to the actuating motion which would be otherwise consumed in frictional drag.

As may best be observed with the lower tailgate in the closed position of Figure 10, the length of cable 222 is slightly in excess of that necessary to simply actuate the upper tailgate 16 and which excess causes the cable to sag slightly. The excess cable and consequent sag are consciously provided to yield the same type of limited lost motion operation described with respect to the modification of Figure 2. Thus, the initial opening movement of the lower tailgate 30 will cause the excess length in cable 222 to be wound upon sheave 180. After the lower tailgate has opened sufficiently that its center-of-mass falls rearwardly of its trunnion axis, the excess length of cable will have been wound upon the sheave 180 and the cable will now transmit an opening or downward force to cable 216.

The connecting device 218 has been provided in order that one of the tailgates may again be manually disconnected to permit power operation of the remaining gate only. In this case, the arrangement is such that the upper gate 16 may be rendered inoperative. Device 218 includes collars 230 and 232 respectively fixed to the free ends of cables 216 and 222. Means is provided for coupling the collars and includes a slot 234 and an enlarged opening 236 formed in collar 230 and a rotatable detent 238 mounted in collar 232. A handle 240 is fixed to detent 238. By rotating the detent 238 through handle 240 so as to align with slot 234 in collar 230 the detent may be moved into or out of opening 236. With the detent disposed within opening 236 the detent 238 can be rotated out of alignment with slot 234 and so lock collars 230 and 232 together. Assuming the collars 230 and 232 to have been disconnected and in order to assure that collar 232 will be in position for reconnecting, a spring member 242 is provided and seats at its lower end upon a bracket 244 suitably mounted on the body. The upper end of spring 242 biases against the collar 232 urging it to its upper position in which it may again be coupled to collar 230.

It should be noted that the radii of sheaves 180 and 210 may be so proportioned as to vary the rate of actuation of the tailgates to insure the gates reach fully open positions at essentially the same time. This provision is analogous to changing the size of worm gears 50 and 54 of Figure 2 as described above.

A further modification of the subject tailgate actuating mechanism is shown in Figures 14 and 15. With respect to this modification, it will be necessary only to describe the mechanism directly connected to the upper tailgate 16 inasmuch as the lower tailgate actuating mechanism is identical with that of Figure 10 and includes the sheave 180 and cable 222 as already described. Likewise, the upper end of cable 222 is again secured to a collar 250 slidably mounted on a track 252 mounted on the vehicle body.

In this modification, however, the extensible linkage mechanism 70 of Figures 2 through 7 is substituted for the cable 216 and the arcuate hinge 210 of Figure 10. Suffice it to say that the extensible linkage mechanism 70 is articulated through the inner member 76 to the leg 26 of hinge 18 and similarly articulated at the other end through outer member 72 to the slidable collar 250. The lost motion mechanisms including slot 80, stud 82 and lever 90, as already described in relation to the modification of Figure 2, function in the same manner as in that case; therefore, a further description thereof is unnecessary.

An advantage of thus combining certain of the features of the modifications of Figures 2 and 10 resides in the elimination of the more costly worm gear arrangement of the earlier modification in favor of the relatively inexpensive sheave and cable arrangement of the later modification, while at the same time incorporating the rigidity of the extensible linkage mechanism which actuates and supports the upper tailgate 16.

While not so shown, it is necessary to provide some means, preferably like the spring 242 of Figure 10, for returning the outer link member 72 to its upper position for coupling with inner link member 76.

Another specie of the present invention is shown in Figures 16 through 19. In this case, a gear segment 260 is again rigidly secured to the lower tailgate trunnion shaft 38. A rotatable shaft 262 is mounted in the vehicle body, preferably within the tailgate jamb 263 and extends from below the floor 14 of the vehicle to proximate the roof 12 and is rotatably supported in suitable bearings 264. Rigidly secured to the rotatable shaft 262 and adapted to meshingly engage with the gear segment 260 is a worm member 266. Also fixed to the rotatable shaft is a gear member 268 adapted to be drivingly connected to a corresponding gear member 270 on the motor shaft 272. Gear members 268 and 270 are preferably of the beveled type.

A second gear segment 274 is mounted on a shaft 276, the latter which is supported in the roof section of the vehicle. A goose neck type hinge 280 is fixed at one end to the upper tailgate 16 and is fixed at the other end to shaft 276. A second worm gear member 282 is fixed to the rotatable shaft 262 and meshingly engages with gear segment 274.

In view of the fact that the worm gears 266 and 282 are on a common operating shaft 262 and inasmuch as the tailgates must pivot in opposite directions about their respective shafts 38 and 276, it is necessary that the gears be oppositely threaded. In other words, when the shaft 262 is rotated to open the tailgate members, the lower worm member 266 should be threaded so as to rotate the lower tailgate 30 in a clockwise direction while the upper worm member 282 should be threaded so as to rotate the upper tailgate 16 in a counter-clockwise direction.

It is intended that this modification, as with the previous modifications, have a lost motion mechanism which permits the lower tailgate 30 to be moved over-center before actuation of the upper tailgate 16 is begun and a further mechanism which permits unlimited opening and closing of one of the tailgates relative to the other.

The lost motion mechanism 286 is shown in detail in Figures 17 and 19 and generally includes two shaft sections 288 and 290 adapted to be rotatably connected by sleeve member 292. Shaft section 288 has a threaded portion 294 which cooperates with a correspondingly internally threaded portion 296 of sleeve 292. A bore 298 is formed in the other end of sleeve 292 and includes a longitudinally extending keyway 300. The lower end of shaft section 290 has a key 302 formed, or otherwise mounted, thereon which slidably projects within keyway 300. Thus, any rotation of sleeve 292 will impart similar rotation to shaft section 290. With the tailgates closed, the lost motion mechanism parts are in the position shown in Figure 17. As shaft section 288 is rotated during the initial opening movement of the lower tailgate 30, sleeve 292 threads downwardly without rotating until, as shown in Figure 19, the bottom of the threaded sleeve portion 296 abuts against the upper end of the shaft section 288. At this point the lower tailgate has passed rearwardly over-center and sleeve 292 begins rotating shaft section 290 to begin opening the upper gate 16.

The frictional drag or bind between the threaded portions 296 and 294 of sleeve 292 and shaft 288 is sufficient that upon reverse rotation of shaft 288 to close the gates, sleeve 292 will rotate with the shaft until the upper gate is closed, at which time shaft rotation will overcome the frictional drag and the sleeve will be threaded upwardly during the remaining closing rotation of shaft section 288.

As with the modifications shown in Figures 2 and 10, it is again desirable due to the delayed opening movement of the upper tailgate 16 to provide some means for increasing its rate of opening movement relative to that of the lower tailgate in order to insure that both tailgates will reach their full open position at the same time. In the present instance, this may be achieved by varying the angular lead or diametral size of the upper worm gear 282 relative to the lower worm 286.

This differential rate of movement between the upper and lower tailgates serves an additional function not heretofore discussed. With such coacting tailgate members, it is common to have the proximate edges thereof co-act in the closed position so that one of these tends to overlap the other and thereby to lock both tailgates through a common locking mechanism. In keeping with this type of locking operation, it will be seen that when the tailgates are in the open position, the faster rate of operation of the upper tailgate will cause the latter to reach its closed position first, after which, through the limited lost motion mechanism, the lower tailgate will continue to close with its upper edge being adapted to co-act with the lower edge of the upper gate, in any well-known manner, permitting the gates to be locked together in a closed position.

Two different lost motion or disconnect mechanisms permitting unlimited opening movement of one of the tailgates with respect to the other, are shown in Figures 16 and 17. The mechanism 300 of Figure 16 includes a common keyway 308 formed in the proximate ends of shaft sections 290 and 310 and a collar member 312 axially slidable relative to said shaft sections and which collar member has internally formed thereon a key 314. As is apparent in Figure 16*a*, key 314 is adapted to bridge and thereby rotatably connect shaft sections 290 and 310. Keyway 308 is sufficiently longer in extent relative to key 314 to permit the collar 312 to be moved axially downwardly an amount sufficient to disconnect the rotary connection between said shafts.

Formed internally of the collar 312 are a pair of axially spaced annular grooves 316 and 318. A radial bore 320 is formed in the intermediate shaft section 290 and has a ball detent 322 disposed therein and urged radially outwardly by a spring 324. The ball detent 322 is adapted to engage within either of the annular grooves to hold the collar in either the rotate or non-rotate position with respect to shaft section 310. The collar 312 also includes an annular flange 326 formed intermediate the ends thereof and adapted to extend through the body jamb 263 to allow manual longitudinal movement of the collar between its upper or lower positions depending on the type of tailgate actuation desired. In other words, if it is desired to condition the mechanism for actuation of the upper tailgate in conjunction with the lower tailgate, collar 312 will be moved to its upper position, as shown in Figure 16*a*, in which the key 314 bridges the groove 308 thereby connecting the shaft sections 290 and 310 for unison operation. On the other hand, if it is desired to actuate only the lower tailgate, collar 312 is moved to its lower position in which event the key 314 is moved out of engagement with that portion of the key 308 formed in the upper shaft section 310 thereby permitting rotation of the intermediate shaft section 290 relative to the upper shaft section 310.

The second disconnect device, shown in Figures 17 and 18, embodies a solenoid actuated clutch device 330 which enables the vehicle operator to remotely control the disconnecting of one of the tailgates. The lower tailgate worm gear 332 is fixed to bevel gear 334 through a short shaft section 336. The gear 332 is internally bored at 338 to provide a bearing support for the lower end of shaft section 288. Shaft section 288 has a member 340 slidably splined thereon and which member has longitudinally extending teeth 342 formed thereon. A corresponding set of teeth 344 are formed internally of worm gear 332. A collar 346 is fixed to shaft 288 to provide a seat for a spring 348, the other of which biases against member 340 to urge teeth 342 into meshing engagement with worm gear teeth 344 and to thereby establish a driving connection between worm gear 332 and shaft 288. A solenoid coil 350 surrounds member 340 and upon energization is adapted to move said member longitudinally out of engagement with the worm gear. Thus, it is possible for the operator to interrupt the drive connection and thereby render inoperative the upper tailgate actuating mechanism by simply energizing the solenoid clutch 330.

It is apparent that various structural modifications may be made to the above-described closure operating mechanisms within the intended scope of the invention as hereinafter set forth in the claims.

I claim:

1. A tailgate operating mechanism including a support, a pair of vertically swinging tailgates pivotally mounted on said support, an operating element mounted proximate the pivotal edge of the first of said tailgates and fixed thereto, said element extending outboard of said tailgate, a motor mounted on the support and operatively connected to the outboard extension of said element, means operatively connecting said motor and said element permitting said motor to rotate said element to arcuately translate the associated tailgate about its pivotal mounting, a telescoping linkage member connected at one end to the second of said tailgates, and means operatively connecting the other end of the telescoping linkage member to the operating element for movement therewith, said linkage member including a lost motion connection permitting a limited initial opening movement of said first tailgate prior to the opening of the second tailgate.

2. A vehicle tailgate operating mechanism including in combination a support, a pair of vertically swinging tailgates pivotally mounted on said support, a first element fixed to a first tailgate proximate the pivotal edge thereof, a motor mounted on said support and operatively connected to said element to rotate the latter and arcuately translate the associated tailgate, a second element operatively connected to the second tailgate, a shaft member rotatably mounted in said support means drivingly connecting said shaft member and said motor, means connecting said second element to said shaft so that the rotation of the latter causes the second element to arcuately translate the second tailgate, and a lost motion mechanism operatively connected in series with said second element and said shaft enabling a limited initial opening movement of said first tailgate without imparting movement to the second tailgate.

3. A vehicle tailgate operating mechanism including in combination a support, a pair of vertically swinging tailgates pivotally mounted on said support, a first element fixed to the first tailgate proximate the pivotal edge thereof, a motor mounted on said support and operatively connected to said element to rotate the latter and arcuately translate the associated tailgate, a second element operatively connected at one end to the second tailgate proximate the pivotal edge thereof, a shaft rotatably mounted in said support and having a helically threaded portion at one end thereof, said motor being operatively connected to said shaft, a nut pivotally connected to the other end of said second element and coacting with said helically threaded shaft portion whereby upon rotation of said shaft the nut will move longitudinally thereof causing said second element to rotate the second tailgate about its pivotal mounting.

4. A tailgate operating mechanism including in combination a support, a pair of aligned vertically swinging tailgates pivotally mounted on said support, a trunnion member affixed to the lower tailgate proximate the bottom edge thereof, a segmental gear mounted on said trunnion, a motor having a rotary screw shaft adapted to drive said gear, an extensible linkage mechanism articulated at one end to the upper tailgate proximate the pivotal edge thereof, a second shaft rotatably mounted in said support, a gear member fixed on said second shaft and operatively connected to the motor screw shaft, a helically threaded portion formed at one end of the second shaft, and a nut member pivotally mounted adjacent the other end of said linkage mechanism, said nut cooperating with said threaded shaft portion to impart movement to the linkage mechanism upon the rotation of said second shaft.

5. A tailgate operating mechanism including in combination a support, a pair of aligned vertically swinging tailgates pivotally mounted on said support, a trunnion member affixed to the lower tailgate proximate the bottom edge thereof, a segmental gear mounted on said trunnion, a motor having a rotary screw shaft adapted to drive said gear, an extensible linkage mechanism articulated at one end to the upper tailgate proximate the pivotal edge thereof, a second shaft rotatably mounted in said support, a gear member fixed on said second shaft and operatively connected to the motor screw shaft, a helically threaded portion formed at one end of the second shaft, a nut member pivotally mounted adjacent the other end of said linkage mechanism, said nut cooperating with said threaded shaft portion to impart movement to the linkage mechanism upon the rotation of said second shaft, and a lost motion device operatively connected with the extensible linkage mechanism to permit limited movement of the second shaft without imparting movement to the upper tailgate, said device including means for rendering the linkage mechanism inoperative to transmit motion to the upper tailgate.

6. A tailgate operating mechanism as defined in claim 5 in which said lost motion device comprises a longitudinally extending slot formed in the inner member of the extensible linkage mechanism, a stud mounted in the outer member of said mechanism and adapted to project within said slot, said stud being retractable in a direction generally normal to said slot, resilient means urging said stud out of engagement with said slot, a handle pivotally mounted on said outer member of said mechanism and having an eccentric cam surface in engagement with said stud, said stud being moved into engagement with said slot when engaged by the high spot on said cam and being moved out of engagement by said resilient means when co-acting with the low spot on said cam.

7. A vehicle tailgate operating mechanism including in combination a support, a pair of aligned vertically swinging tailgates pivotally mounted on the support, a trunnion fixed to the lower tailgate proximate the pivotal edge thereof, a linkage mechanism pivotally connected at one end to the upper tailgate, means supporting the other end of said linkage mechanism for linear movement, pulley means fixed for rotation with said trunnion, a motor mounted on said support and drivingly connected to said pulley means for rotating the trunnion and the lower tailgate, and a flexible cable connecting said pulley and the linear movement end of said linkage mechanism whereby rotary movement of said lower tailgate is adapted to transmit a similar movement to the upper tailgate, said linkage mechanism including a lost motion connection permitting the lower tailgate to begin opening in advance of the upper tailgate.

8. A vehicle including a pair of pivoted closure members cooperating to close an opening in the vehicle, power means permitting separate or unison actuation of said closure members, said power means comprising a motor, a motor output shaft, a first actuating device operatively connected to one of said closure members, a second actuating device operatively connected to the other closure member and a plurality of clutch means for selectively coupling the respective actuating devices to the motor output shaft permitting either or both of said closure members to be actuated upon actuation of said motor, and a lost motion mechanism operative during the unison actuation of said closure members to permit a limited initial opening movement of one member while the other member remains stationary.

9. A vehicle including a pair of pivoted closure members cooperating to close an opening in a vehicle and power means permitting separate or unison actuation of said closure members, said power means comprising a motor, a motor shaft, a first pair of axially spaced freely rotatable gear elements mounted on said shaft, a pair of drive transmitting elements splined for rotation with said shaft and means for selectively coupling respective drive transmitting elements with respective gear elements, a second pair of gear elements, means operatively connecting said second pair of gear elements respectively with the closure members, said first gear elements being respectively meshed with said second gear elements permitting said closure members to be separately or jointly actuated.

10. A vehicle as defined in claim 9 in which said coupling means comprises a set of clutch teeth on each of said first gear elements, a corresponding set of teeth on each of said splined elements, resilient means urging each of said splined elements longitudinally into toothed engagement with one of said first pair of gear elements, and solenoid means coacting with each of said splined elements to move said splined elements out of engagement with the meshed gear element.

11. A vehicle tailgate operating mechanism including in combination a support, a pair of aligned vertically swinging tailgates pivotally mounted on said support, trunnion means fixed to each of said tailgates proximate the pivotal edges thereof, a gear member mounted on each of said trunnion means, a common operating shaft rotatably mounted in said support, said shaft including a pair of axially spaced oppositely threaded helical gear elements disposed adjacent said gear members and cooperating therewith to oppositely rotate said tailgates upon rotation of said shaft, one of said elements being rotatable relative to said shaft, a motor mounted in said support and adapted to be operatively connected to said helical gear elements, and clutch means for disconnectably coupling said shaft and said relatively rotatable gear element.

12. A vehicle tailgate operating mechanism including in combination a support, a pair of aligned vertically swinging tailgates pivotally mounted on said support, trunnion means fixed to each of said tailgates proximate the pivotal edges thereof, a gear member mounted on each of said trunnion means, a common operating shaft rotatably mounted in said support, said shaft including a pair of axially spaced oppositely threaded helical gear elements disposed adjacent said gear members and cooperating therewith to oppositely rotate said tailgates upon rotation of said shaft, and a motor mounted in said support, means drivingly connecting said motor and said shaft, means for interrupting the drive from said shaft to one of said tailgates to permit the remaining tailgate to be actuated without the other, and a lost motion mechanism operatively connected to said common operating shaft to permit limited rotary movement of one of said helical gear elements relative to the other.

13. A motor vehicle having a pair of vertically swinging pivoted tailgates cooperating to close an opening in the vehicle, trunnion means fixed to and pivotally supporting each tailgate from the vehicle, a segmental pulley fixed to each trunnion, a first flexible cable fixed at one end to one of said pulleys, a second flexible cable fixed at one end to the other pulley, means for connecting the free ends of said cables, said connecting means including coupling elements respectively fixed to the free ends of said cables and a device for disconnectably coupling said elements to permit coordinated actuation of said tailgates, a guideway mounted on said vehicle intermediate the fixed ends of said cables, said coupling elements being slidably mounted upon said guideway, and motor means operatively connected to one of said trunnions whereby said tailgates may be power actuated.

14. A motor vehicle as defined in claim 13 in which said coupling device includes a slotted recess formed in one of the coupling elements, a rotatable detent mounted on the other coupling element, said detent cooperating with said slotted recess to disconnectably couple said elements.

15. A motor vehicle having a pair of vertically swinging pivoted tailgates cooperating to close an opening in the vehicle, trunnion means fixed to and pivotally supporting each tailgate from the vehicle, a segmental pulley fixed to each trunnion, a first flexible cable fixed at one end to one of said pulleys, a second flexible cable fixed at one end to the other pulley, means for connecting the free ends of said cables, said connecting means including coupling elements respectively fixed to the free ends of said cables and a device disconnectably coupling said elements to permit coordinated actuation of said tailgates, a guideway mounted on said vehicle intermediate the fixed ends of said cables, said coupling elements being slidably mounted upon said guideway, motor means operatively connected to one of said trunnions whereby said tailgates may be power actuated, and resilient means connected to the free end of one of said cables biasing said free end toward the free end of the other cable.

16. A motor vehicle having a pair of vertically swinging pivoted tailgates cooperating to close an opening in the vehicle, trunnion means fixed to and pivotally supporting each tailgate from the vehicle, a segmental pulley fixed to each trunnion, a first flexible cable fixed at one end to one of said pulleys, a second flexible cable fixed at one end to the other pulley, means for connecting the free ends of said cables, said connecting means including coupling elements respectively fixed to the free ends of said cables, a slotted recess formed in one of the coupling elements, a rotatable detent mounted on the other coupling element, said detent cooperating with said slotted recess to disconnectably couple said elements, a guideway mounted on said vehicle intermediate the fixed ends of said cables, said coupling elements being slidably mounted upon said guideway, and motor means pivotally mounted in said vehicle proximate the lower tailgate pulley, said motor including a rotatable screw shaft, the lower tailgate pulley including a projection having a stud rotatably mounted therein, said stud including a threaded bore receiving said motor screw shaft whereby rotation of said shaft will cause the stud to move longitudinally thereof imparting a rotary movement to said trunnion.

17. A vehicle closure operating mechanism comprising a support, a pair of doors pivotally connected to said support, operating means interconnecting said doors and adapted to move said doors in unison, said operating means including a lost motion mechanism permitting limited initial opening movement of one of said doors relative to the other, and a disconnect mechanism operatively connected to said doors to permit unlimited movement of one of said doors relative to the other, said operating means also including means providing differential rates of movement of said doors when said doors are actuated in unison.

References Cited in the file of this patent

UNITED STATES PATENTS

| | | |
|---|---|---|
| 1,410,901 | Elder | Mar. 28, 1922 |
| 2,050,987 | Williams | Aug. 11, 1936 |
| 2,221,039 | Babcock | Nov. 12, 1940 |
| 2,222,841 | Houlis | Nov. 26, 1940 |
| 2,249,932 | Beal | July 22, 1941 |
| 2,476,111 | Opalek | July 12, 1949 |